United States Patent
Lefurgy et al.

(10) Patent No.: US 9,733,685 B2
(45) Date of Patent: Aug. 15, 2017

(54) TEMPERATURE-AWARE MICROPROCESSOR VOLTAGE MANAGEMENT

(71) Applicant: INTERNATIONAL BUSINESS MACHINES CORPORATION, Armonk, NY (US)

(72) Inventors: Charles R. Lefurgy, Austin, TX (US); Karthick Rajamani, Austin, TX (US); Richard F. Rizzolo, Red Hook, NY (US); Malcolm S. Allen-Ware, Tuscon, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/967,929

(22) Filed: Dec. 14, 2015

(65) Prior Publication Data

US 2017/0168534 A1 Jun. 15, 2017

(51) Int. Cl.
*G06F 1/00* (2006.01)
*G06F 1/26* (2006.01)
*G05F 1/625* (2006.01)

(52) U.S. Cl.
CPC ............ *G06F 1/26* (2013.01); *G05F 1/625* (2013.01)

(58) Field of Classification Search
CPC ........ G06F 1/3203; G06F 1/26; G06F 1/3296; G06F 1/32
See application file for complete search history.

(56) References Cited

U.S. PATENT DOCUMENTS

| | | | | |
|---|---|---|---|---|
| 6,472,899 B2 * | 10/2002 | Osburn | ................ | G01R 31/30 702/118 |
| 6,680,604 B2 * | 1/2004 | Muratov | ................ | G06F 1/26 323/283 |
| 7,636,864 B2 * | 12/2009 | Burton | ................ | G06F 1/26 323/234 |
| 7,814,339 B2 | 10/2010 | Monferrer et al. | | |

(Continued)

FOREIGN PATENT DOCUMENTS

| | | |
|---|---|---|
| EP | 2778807 A1 | 9/2014 |
| WO | 2011153492 A1 | 12/2011 |
| WO | 2014134211 A1 | 9/2014 |

OTHER PUBLICATIONS

Zhao et al.; "Thermal-aware Voltage Droop Compensation for Multi-core Architectures", GLSVLSI'10, May 16-18, 2010, pp. 1-6.

(Continued)

*Primary Examiner* — Thomas Lee
*Assistant Examiner* — Zhipeng Wang
(74) *Attorney, Agent, or Firm* — Cantor Colburn LLP

(57) ABSTRACT

A method, system, and computer program product for controlling power supplied to a processor is disclosed. A voltage regulator is set to a first voltage regulator set point, wherein the first voltage regulator set point provides a first load line for operation of the processor. A change in an operation of the processor from a first operating condition along the first load line to a second operating condition along the first load line is determined. The voltage regulator is the set to a second voltage regulator set point and the processor is operated at a third operating condition on a second load line corresponding to the second voltage regulator set point.

15 Claims, 6 Drawing Sheets

(56) References Cited

U.S. PATENT DOCUMENTS

| | | | |
|---|---|---|---|
| 7,900,069 B2 * | 3/2011 | Allarey | G06F 1/3203 323/234 |
| 8,051,307 B2 * | 11/2011 | Huang | G06F 1/3203 323/234 |
| 8,527,801 B2 | 9/2013 | Brock et al. | |
| 8,560,869 B2 * | 10/2013 | Allarey | G06F 1/3203 323/234 |
| 2005/0258894 A1 * | 11/2005 | Levit | G06F 1/3203 327/544 |
| 2007/0001694 A1 | 1/2007 | Jahagirdar et al. | |
| 2007/0247216 A1 | 10/2007 | Kolinummi et al. | |
| 2008/0168287 A1 * | 7/2008 | Berry | G06F 1/266 713/323 |
| 2008/0244294 A1 * | 10/2008 | Allarey | G06F 1/3203 713/320 |
| 2009/0100437 A1 | 4/2009 | Coskun et al. | |
| 2009/0327776 A1 * | 12/2009 | Nguyen | G06F 1/26 713/320 |
| 2010/0083009 A1 * | 4/2010 | Rotem | G06F 1/3203 713/300 |
| 2010/0153954 A1 * | 6/2010 | Morrow | G06F 1/329 718/102 |
| 2011/0004774 A1 | 1/2011 | Hansquine et al. | |
| 2011/0291746 A1 | 12/2011 | Ibrahim et al. | |
| 2012/0054515 A1 * | 3/2012 | Naffziger | G06F 1/3203 713/320 |
| 2012/0209559 A1 | 8/2012 | Brower | |
| 2013/0311799 A1 | 11/2013 | Fitzpatrick et al. | |
| 2014/0189710 A1 | 7/2014 | Sur et al. | |
| 2014/0225678 A1 | 8/2014 | Yano et al. | |
| 2014/0316581 A1 | 10/2014 | Fadell et al. | |
| 2015/0178138 A1 * | 6/2015 | Saha | G06F 9/5094 718/104 |
| 2016/0054422 A1 * | 2/2016 | Nemani | G01K 13/00 324/130 |

OTHER PUBLICATIONS

Price, D. C. et al.; Optimizing performance per watt on GPUs in High Performance Computing: temperature, frequency and voltage effects, arXiv preprint arXiv: 1407.8116 (2014).

* cited by examiner

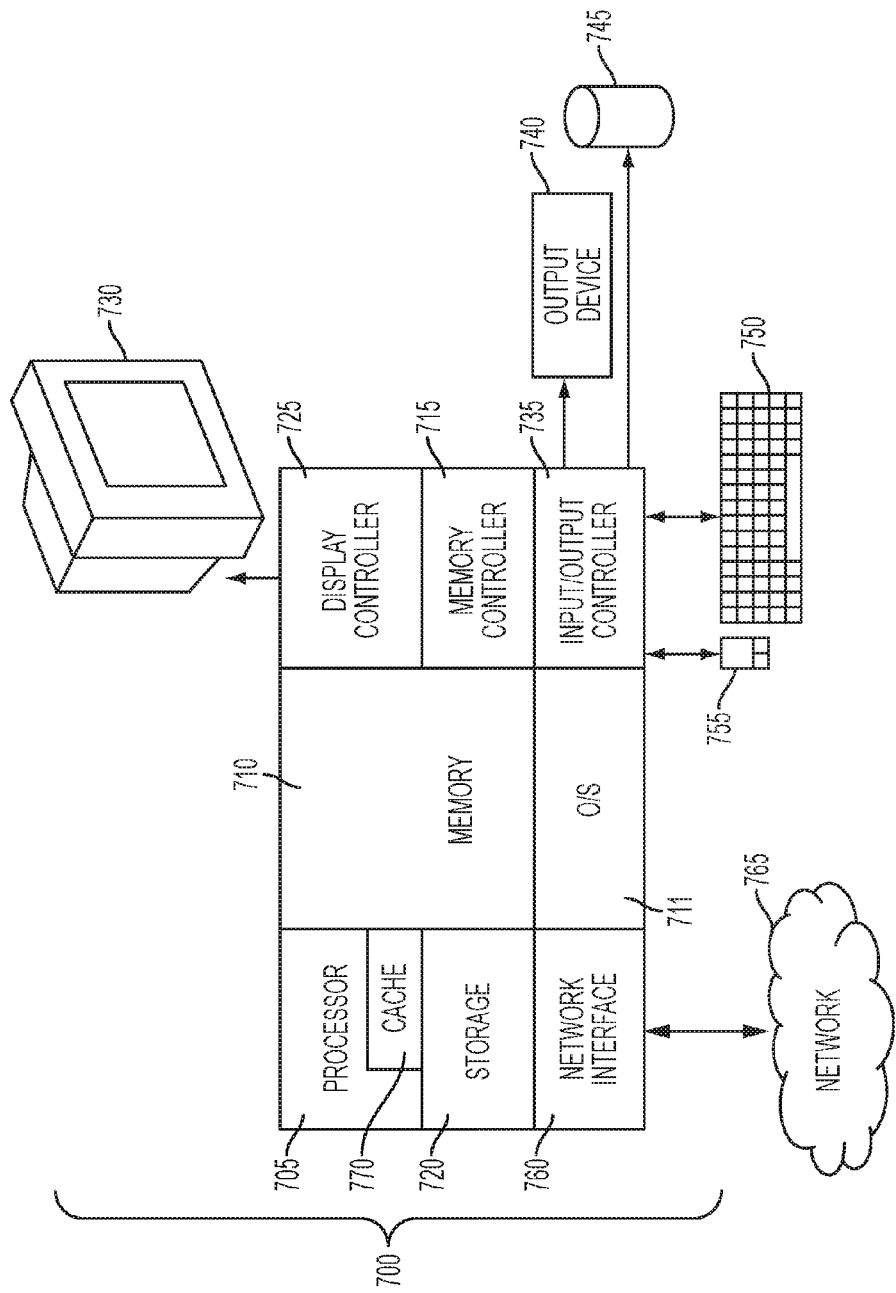

TEMPERATURE-AWARE MICROPROCESSOR VOLTAGE MANAGEMENT

STATEMENT REGARDING FEDERALLY SPONSORED RESEARCH OR DEVELOPMENT

This invention was made with Government support under HR0011-13-C-0022 awarded by Defense Advanced Research Projects Agency. The Government has certain rights to this invention.

BACKGROUND

Embodiments of the present invention relate to power operations with respect to processors, and more specifically, to temperature-aware voltage management for a power supplied to the processor.

Computer systems include processors and/or microprocessors that require different levels of power during operation, based on temperature conditions, workload requirements, etc. A voltage regulator supplies a voltage across a circuit to provide power to the processor. The voltage level of the voltage regulator is generally set to a fixed level during a testing phase of the processor so that the processor is provided with enough voltage in order to operate under worst-case conditions, i.e., high temperature, maximum workload, high clock frequency, etc., including an extra voltage as a margin of safety. However, a processor under normal operating conditions rarely encounters such worst-case conditions and therefore does not need voltage at the level established at the voltage regulator during the testing phase. Therefore, during normal operation of the processor, the voltage settings provided by voltage regulators ends up using more power than is necessary for proper operation of the processor.

SUMMARY

Embodiments include a method, system, and computer program product for controlling power supplied to a processor. A method includes setting a voltage regulator to a first voltage regulator set point, wherein the first voltage regulator set point provides a first load line for operation of the processor; determining a change in an operation of the processor from a first operating condition along the first load line to a second operating condition along the first load line; setting the voltage regulator to a second voltage regulator set point; and operating the processor at a third operating condition on a second load line corresponding to the second voltage regulator set point.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 illustrates a block diagram of a computer system for use in implementing a system or method according to some embodiments.

DETAILED DESCRIPTION

Embodiments of the present invention provide a method, system and computer program product for providing power to a processor. A voltage regulator supplies a load line providing a power constraint with which the processor operates. When the processor is in a state in which it is not using a lot of current, such as in an idle state, the voltage regulator is adjusted to lower the voltage provided by the voltage regulator, allowing the processor to use less power. Embodiments use a combination of (1) leakage current measured at manufacturing time under different voltage conditions; (2) load-line characterization from design parameters; and (3) run-time temperature monitoring to calculate a safe regulator voltage set point and apply the calculated setting to a running microprocessor. This can allow the voltage regulator set point to be safely reduced, which can reduce the regulator current and chip power. The reduced current and power can then be spent by increasing chip clock frequency to reach a higher performance.

Figure 1:
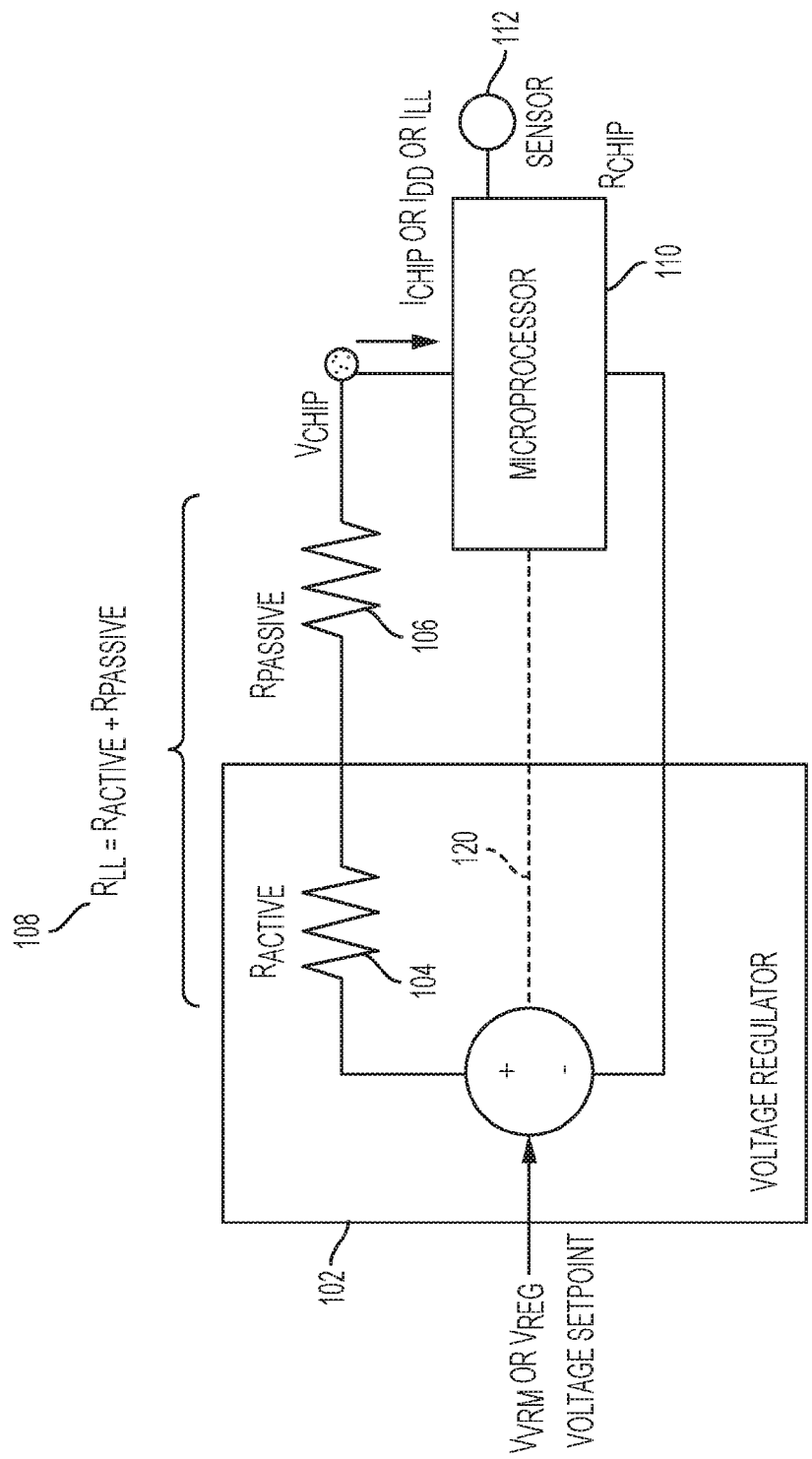
FIG. 1 shows an illustrative schematic circuit for powering a processor or microprocessor in accordance with an embodiment of the present invention.

FIG. 1 shows an illustrative schematic circuit 100 for powering a processor or microprocessor in accordance with an embodiment. The circuit 100 shown in FIG. 1 includes a voltage regulator 102 that powers the circuit 100 and the processor 110 by supplying a voltage $V_{vrm}$ across the circuit 100. The voltage regulator 102 includes an internal resistance $R_{active}$ 104 which affects the voltage provided to the circuit 100 by the voltage regulator 102. Current flowing through the circuit 100 also experiences a packaging resistance $R_{passive}$ 106. The load line resistance $R_{LL}$ 108 is a total resistance between $V_{vrm}$ and the processor 110. Therefore, $R_{LL}$ (108) is the sum of $R_{active}$ (104) and $R_{passive}$ (106). A processor 110 or chip has a resistance $R_{chip}$. A processor voltage $V_{chip}$ and processor current $I_{chip}$ are variable quantities which depend on various operating parameters, such as clock speed, processor temperature, workload, etc.

The voltage $V_{vrm}$ at the voltage regulator 102 is related to the voltage $V_{chip}$ of the processor 110 by the equation:

$$V_{vrm} = V_{chip} + I_{LL} \times R_{LL} \qquad \text{Eq. (1)}$$

where $I_{LL}$ is a load line current passing through the circuit 100. During manufacture of the processor 110, a testing phase occurs in which the processor is operated under a scenario of maximal workload and environmental conditions, such as at high temperatures, etc. Once the processor 110 is confirmed to be able operate under these conditions, the $V_{chip}$ that is measured under these conditions is used to determine the necessary regulator voltage $V_{vrm}$. Often a margin of safety is taken into consideration when establishing $V_{vrm}$. The regulator voltage $V_{vrm}$ and corresponding current from the testing phase can be recorded for later use. The processor current $I_{chip}$ is also referred to herein as $I_{dd}$ and $I_{LL}$.

The load line current $I_{LL}$ is a summation of a dynamic current running the processor and a leakage current, as indicated in Eq. (2):

$$I_{LL}=I_{leak}(V,T)+I_{dynamic} \quad \text{Eq. (2)}$$

where V is a voltage (i.e. $V_{chip}$) and T is a temperature associated with the microprocessor. The leakage current is a large portion of the total current. The leakage current is dependent on several parameters, including temperature and therefore is different for a processor operating under a worst case scenario and a processor operating under normal operating conditions. This difference in leakage current between these two scenarios is calculated as shown in Eq. (3):

$$\Delta I_{leak}=I_{leak}(V,T_{worst\ case})-I_{leak}(V,T_{now}+T_{margin}) \quad \text{Eq. (3)}$$

where $T_{worst\ case}$ is the worst-case temperature (e.g., 85 degrees Celsius), $T_{now}$ is a present time temperature (e.g., 50-70 degrees Celsius) and $T_{margin}$ is a maximum temperature rise during a control interval. The change in the leakage current can be used to optimize the regulator voltage $V_{vrm}$ by introducing an additional term into Eq. (1), as shown in Eq. (4):

$$V_{vrm\_optimized}=V_{chip}(I_{LL}-\Delta I_{leak}) \times R_{LL} \quad \text{Eq. (4)}$$

In one embodiment, a sensor or detector 112 is coupled to the processor 110 and measures an operating parameter of the processor 110. The sensor 112 can measure a current in the processor 110. Alternatively, the sensor 112 can measure a temperature of the processor 110 of a power through the voltage regulator. In additional embodiments, the sensor 112 can include multiple sensors and can measure current, temperature and/or power. The operating parameter measurements can be used to change a voltage regulator set point at the voltage regulator 102 according to the methods disclosed herein, as indicated by control line 120. The processor 110 provides a signal to the voltage regulator 102 in order to change the voltage regulator set point, i.e., the voltage $V_{vrm}$.

Figure 2:
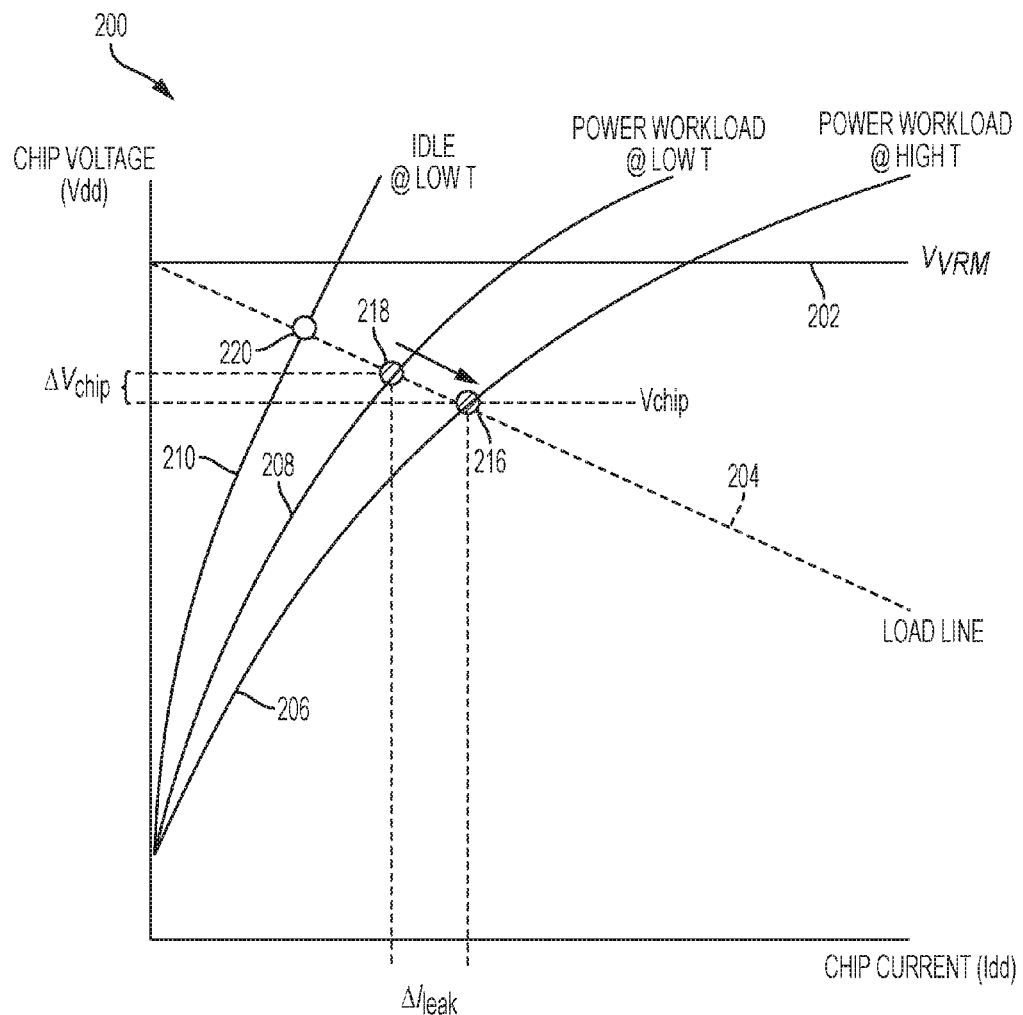
FIG. 2 shows a graph illustrating operating values for a processor included in the circuit shown in FIG. 1, according to an embodiment.

FIG. 2 shows a graph 200 illustrating operating values for a processor 110 included in the circuit 100 shown in FIG. 1 according to an embodiment. Current is shown along the abscissa and voltage is shown along the ordinate. Line 202 represents a voltage set point $V_{vrm}$ for the voltage regulator established during a testing phase of the processor. Load line 204 represents a voltage-current relation corresponding to various operating conditions on the processor given the regulator voltage $V_{vrm}$. Load line 204 has a negative slope. During operation, the voltage-current relationship at the processor 110 (the "workload profile") occurs at a point along the load line 204 representing an operating condition of the processor.

Three workload profiles (206, 208, 210) are indicated along load line 204 for illustrative purposes. A first workload profile 206 represents power requirements for operation of the processor with a relatively large workload and at high temperatures and can represent the workload profile used as the maximal workload an environmental conditions during the testing process. First workload profile (206) intersects the load line at operating condition 216 which has corresponding current and voltage of $(I_1, V_1)$. Second workload profile 208 represents power requirements for operation of the processor with a medium workload and at low temperatures and intersects the load line at operating condition 218 having corresponding current and voltage of $(I_2, V_2)$. Third workload profile 208 represents power requirements for operation of the processor with a small workload and at low temperatures, such as an idle condition for the processor, and intersects the load line at operating condition 220 having corresponding current and voltage of $(I_3, V_3)$.

As the conditions for operation of the processor 110 moves from operating along the load line 204 from operating condition 216, corresponding to a high workload, to operating condition 218, corresponding to a lower workload, the current decreases from $I_1$ to $I_2$, whereas $I_1$ is greater than $I_2$. This decrease in current is indicated as $\Delta I_{leak}$ along the abscissa. The $\Delta I_{leak}$ is a temperature-dependent parameter and therefore can be determined either by direct measurements of current or indirectly by measurement of temperatures. Since operating conditions of the processor are confined to the load line 204, the voltage increases from $V_1$ to $V_2$, whereas $V_1$ is less than $V_2$. This increase in voltage is indicated as $\Delta V_{chip}$ along the ordinate. It is evident that more voltage is provided across the processor 110 when the processor 110 is in the idle condition ($V_3$ of point 220) than when the processor is working at maximum capacity ($V_1$ of point 216).

Figure 3:
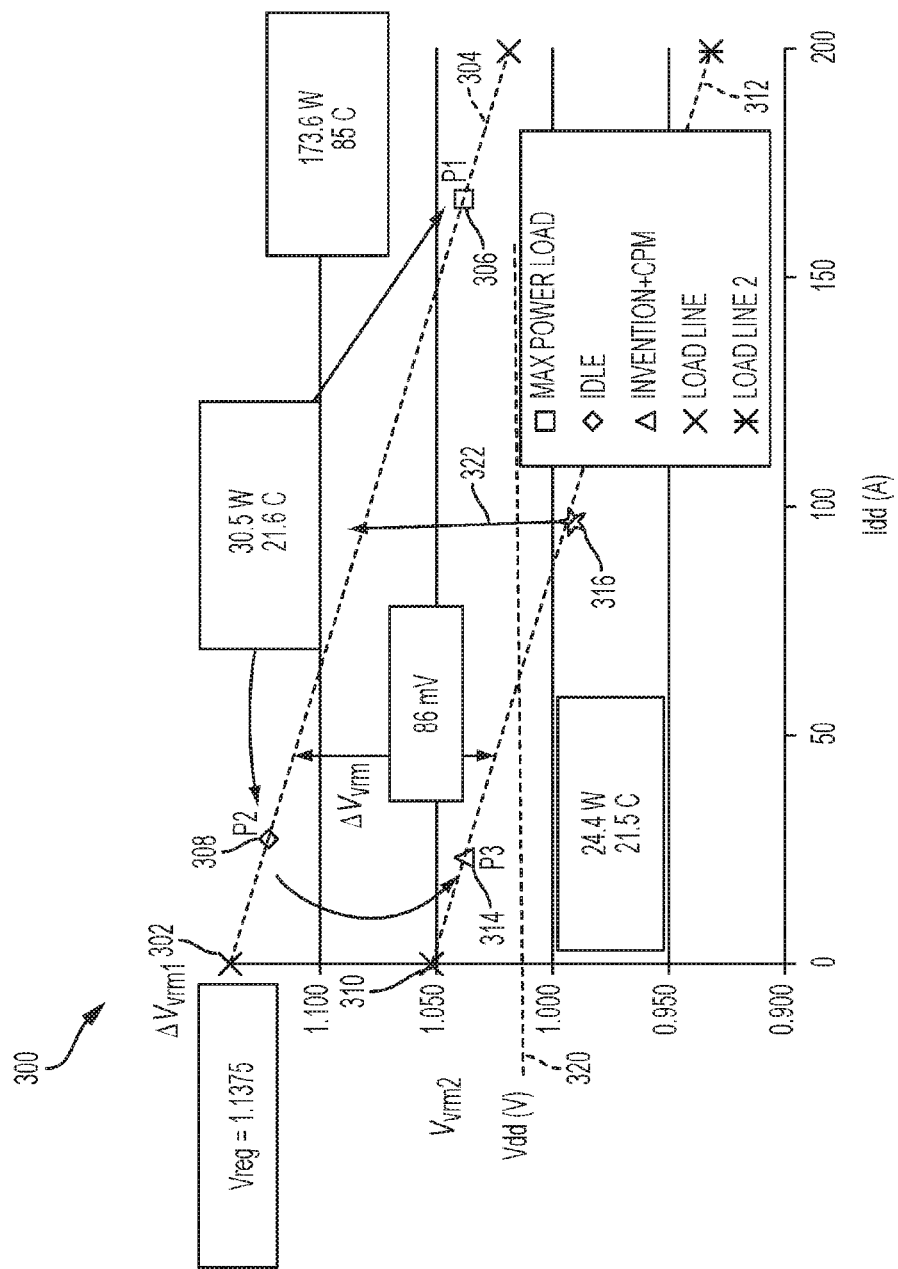
FIG. 3 shows a graph illustrating operation of the processor using the methods disclosed herein according to an embodiment.

FIG. 3 shows a graph 300 illustrating operation of the processor using the methods disclosed herein according to an embodiment. Chip current $I_{dd}$ is shown along an abscissa and chip voltage $V_{dd}$ is shown along an ordinate. A first regulator voltage set point ($V_{vrm1}$) 302 is shown as well as a first load line 304 corresponding to the first regulator voltage set point $V_{vrm1}$. Also, a second regulator voltage set point ($V_{vrm2}$) 310 is shown as well as a second load line 312 corresponding to the second regulator voltage set point $V_{vrm2}$. The second regulator voltage set point $V_{vrm2}$ can be used when the processor is working under low operating conditions and can be determined from current or temperature measurements, as discussed below. In the illustrative embodiment of FIG. 3, the first regulator voltage set point $V_{vrm1}$ (302) is 1.1375 V. A first operating condition 306 for the processor 110 is shown along the first load line 304. For illustrative purposes only, the first operating condition 306 is shown as consuming 173.6 Watts of power and operating at a temperature of 85 degrees Celsius. In one embodiment, the first operating condition 306 corresponds to a power requirement of the processor 110 under a maximum power load scenario. However, the first operating condition 306 can be any workload setting of the processor. The first operating condition 306 is indicated by P1 and defines a current and voltage $(I_{P1}, V_{P1})$ for operating the processor.

A second operating condition 308 of the processor is shown which corresponds to a second power load that is less than the first power load of the processor 110. For illustrative purposes only, the second operating condition 308 is shown as consuming 30.5 Watts of power and operating at a temperature of 21.6 degrees Celsius. The regulator voltage set point for the second operating condition 308 is still $V_{vrm1}$. The second operating condition 308 is indicated as P2 and defines a current and voltage $(I_{P2}, V_{P2})$ for operating the processor. The second operating condition 308 can be an idle condition of the processor or a near-idle condition of the processor.

A third operating condition 314 corresponds to operation of the processor on the second load line 312 corresponding to the second regulator voltage set point ($V_{vrm2}$) 310. The third operating condition 314 is indicated by P3 and defines a current and voltage ($I_{P3}$, $V_{P3}$) for operating the processor. When the processor 110 is being operated in the second operating condition 308, the regulator voltage set point is lowered from $V_{vrm1}$ to $V_{vrm2}$, so that the processor can operate at the third operating condition 314 along load line 312. For illustrative purposes only, the third operating condition 314 is shown as consuming 24.4 Watts of power and operating at a temperature of 21.5 degrees Celsius. Thus, the processor 110 consumes less power operating in the third operating condition 314 than when working in the second operating condition 308.

The amount of change in regulator voltage $\Delta V_{vrm}$ can be calculated so that the processor voltage $V_{P3}$ at the third operating condition 314 is equal to the processor voltage $V_{P1}$ at the first operating condition 306. In one embodiment, the change in current between first operating condition 306 and second operating condition 308 (i.e., $I_{P1}$-$I_{P2}$) can be measured and used to determine a change in the voltage regulator (i.e., $\Delta V_{vrm}$) that can be applied to the regulator voltage set point $V_{vrm1}$. For example, a slope of the first load line 304 can be determined and used along with the change in current to determine $\Delta V_{vrm}$. Therefore, when the processor 110 is determined to be operating at the second operating condition 308, the regulator voltage can be changed from the first regulator voltage set point $V_{vrm1}$ to the second regulator voltage set point $V_{vrm2}$.

Guard-band protection can be provided to ensure the processor has a sufficient voltage to operate when the voltage for the voltage regulator has been reduced to the second voltage set point. In particular, a minimum voltage threshold 320 can be defined with respect to the third operating condition 314 so that the threshold 320 is less than the third operating condition 314. When operating at the third operating condition 314, a sudden increase in power load can cause the processor 110 to move along second load line 411. This movement causes an undesirable droop in the operating voltage. The change in operation of the processor is indicated by fourth operating condition 316 for illustrative purposes. At the fourth operating condition 316, the voltage $V_{P4}$ is below the minimum voltage threshold 320. The regulator voltage is thus adjusted back to the first regulator voltage set point $V_{vrm1}$, thereby allowing operation of the processor on load line 304, as indicated by arrow 322. Readjusting the regulator voltage back to the first regulator voltage set point $V_{vrm1}$ protects the voltage in the processor from becoming too low for proper operation of the processor.

An alternative embodiment uses a guard-band protection element in the form of a Critical Path Monitor (CPM) coupled to a digital phase-lock loop (DPLL) clock generation circuit. The Critical Path Monitor (CPM) is a time-to-digital converter that represents a timing margin offset from the circuit timing of a reference workload operating under a reference processor voltage and processor temperature. The timing margin is sensitive to the voltage of the processor and therefore the CPM can be calibrated to protect against voltage droops First, the CPM is calibrated under a high workload stress under particular voltage and temperature conditions (for example, operating condition 306). Second, when workload conditions 308 (such as an idle condition, or the processed instructions per second is sensed to be below a threshold) are detected, the voltage is reduced from a first voltage regulator set point $V_{vrm1}$ to a second voltage regulator set point $V_{vrm2}$ as described above with respect to FIG. 3. Third, on a more stressful workload being applied causing voltage to droop below threshold 320, the CPM causes the DPLL to lower frequency to maintain sufficient timing margin to operate the processor correctly. Fourth, on detecting the DPLL responding to the CPM signal, the voltage is raised back to the first voltage set point $V_{vrm1}$. Finally, the CPM signals an increase in timing margin to the DPLL which causes the DPLL to raise its frequency back to the desired target frequency.

In another embodiment, a guard-band margin can be provided in the calculation for determining the second (reduced) voltage regulator voltage set point. To set the second voltage set point, the present current ($I_{dd}$) through the processor is measured. Then the chip voltage $V_{dd\_wc}$ for the worst case scenario is retrieved. This worst case voltage $V_{dd\_wc}$ can be provided from manufacturing data. The second regulator set point can be calculated using:

$$V_{vrm2}=V_{dd\_wc}R_{LL}*I_{dd}+\text{guardband\_margin} \qquad \text{Eq. (5)}$$

The voltage regulator is then set to $V_{vrm2}$. A guard-band monitor voltage can then be adjusted if necessary.

In another embodiment, the regulator voltage is adjusted to its second voltage set point based on a temperature of the processor. The leakage current ($I_{ref}$) and associated temperature ($T_{ref}$) for a high power operating condition under operation along the first load line at a first voltage regulator set point are measured or obtained. A leakage current for present conditions (e.g., the second operating condition) can then be calculated using the present temperature T measurements as shown in Eq. (6):

$$I_{leak}(T)=I_{ref}*S^{(T-T_{ref})/10} \qquad \text{Eq. (6)}$$

where S is a scaling factor to relate temperature to current, T is the present temperature, and $I_{ref}$ is a reference current at corresponding reference temperature $T_{ref}$. Typical values for S range from 1.20 to 1.35 for 22 nm CMOS technology. The change in leakage current is calculated as a difference between the reference leakage current and the present workload leakage current:

$$\Delta I_{LL}=I_{ref}-I_{leak}(T) \qquad \text{Eq. (8)}$$

The change in leakage current $\Delta I_{LL}$ can then be used to determine a change in regulator voltage (See Eq. 9) which can then be used to calculate a second voltage set point for the voltage regulator.

In another embodiment, power input into the voltage regulator $P_{Vdd\_in}$ can be measured. Using an efficiency of the regulator, a power out of the voltage regulator $P_{Vdd\_out}$ can be determined. Dividing the $P_{Vdd\_out}$ by the voltage regulator set point yields a current load $I_{load}$. The change in leakage current $\Delta I_{LL}$ is a difference between the chip current $I_{load}$ at present and the chip current $I_{max}$ for the worst case scenario. Once, $\Delta I_{LL}$ has been determined a new voltage regulator set point can be determined using $$V_{vrm2}=V_{vrm1}-\Delta I_{LL} \times R_{LL} \qquad \text{Eq. (9)}$$

Figure 4:
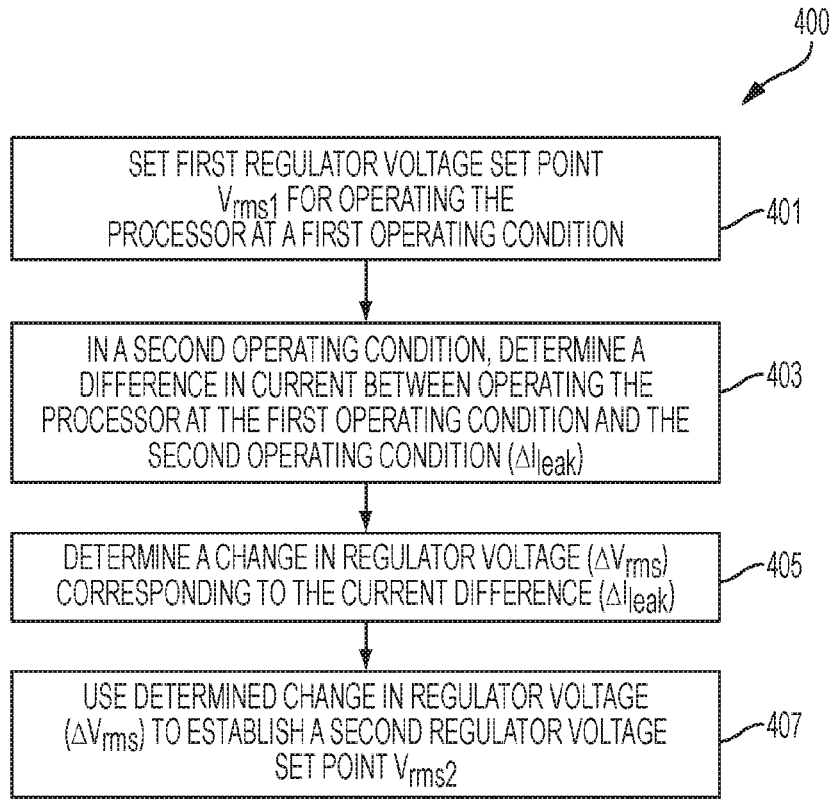
FIG. 4 shows a flowchart of a method for operating the process according to an embodiment of the present invention.

FIG. 4 shows a flowchart 400 of a method for operating the process according to an embodiment of the present invention. In Box 401, a first operating condition is determined and a first regulator voltage set point $V_{vrm1}$ is established to ensure operation of the processor at the first operating condition. In Box 403, a difference in current ($\Delta I_{leak}$) is determined between a second operating condition at which the processor is currently operating and the first operating condition. In Box 405, the difference in current is used to determine a change in the voltage ($\Delta V_{vrm}$) at the voltage regulator that provides operation of the processor at a third operating condition in which a same current ($I_{P2}$) is provided to the processor as in the second operating condition but a same voltage ($V_{P1}$) is provided to the processor as in the first operating condition. In Box 407, the voltage regulator is then set to the second regulator voltage set point $V_{vrm2}$, thereby enabling operation of the processor at the third operating condition.

In one embodiment, difference in current ($\Delta I_{leak}$) can be determined by measuring current through the processor. In another embodiment, the difference in current can be determined by measuring a temperature of the processor and determining a current difference from the difference in temperature.

Figure 5:
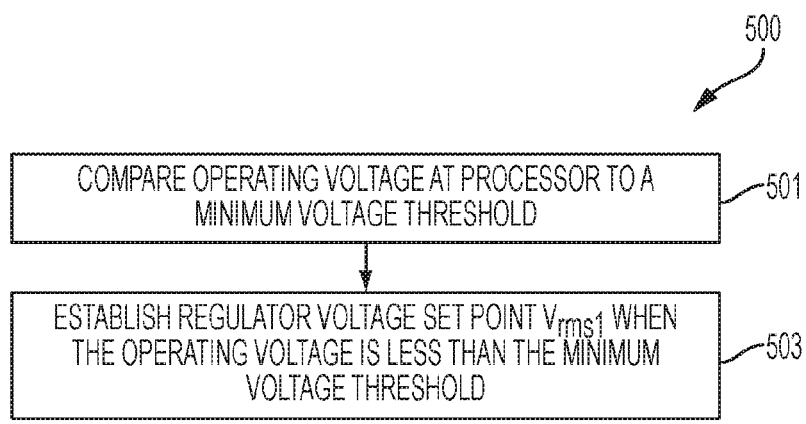
FIG. 5 shows a flowchart for re-establishing an original regulator voltage set point at according to an embodiment of the present invention.

FIG. 5 shows a flowchart 500 for re-establishing the regulator voltage set point at $V_{vrm1}$ according to an embodiment of the present invention. In box 501, the voltage is measured and compared to a minimum voltage threshold. The voltage will droop as workload increases. In box 503, wherein the voltage falls below the minimum voltage threshold, the first regulator voltage set point $V_{vrm1}$ is re-established to allow operation of the processor at a voltage above the minimum voltage threshold.

Figure 6:
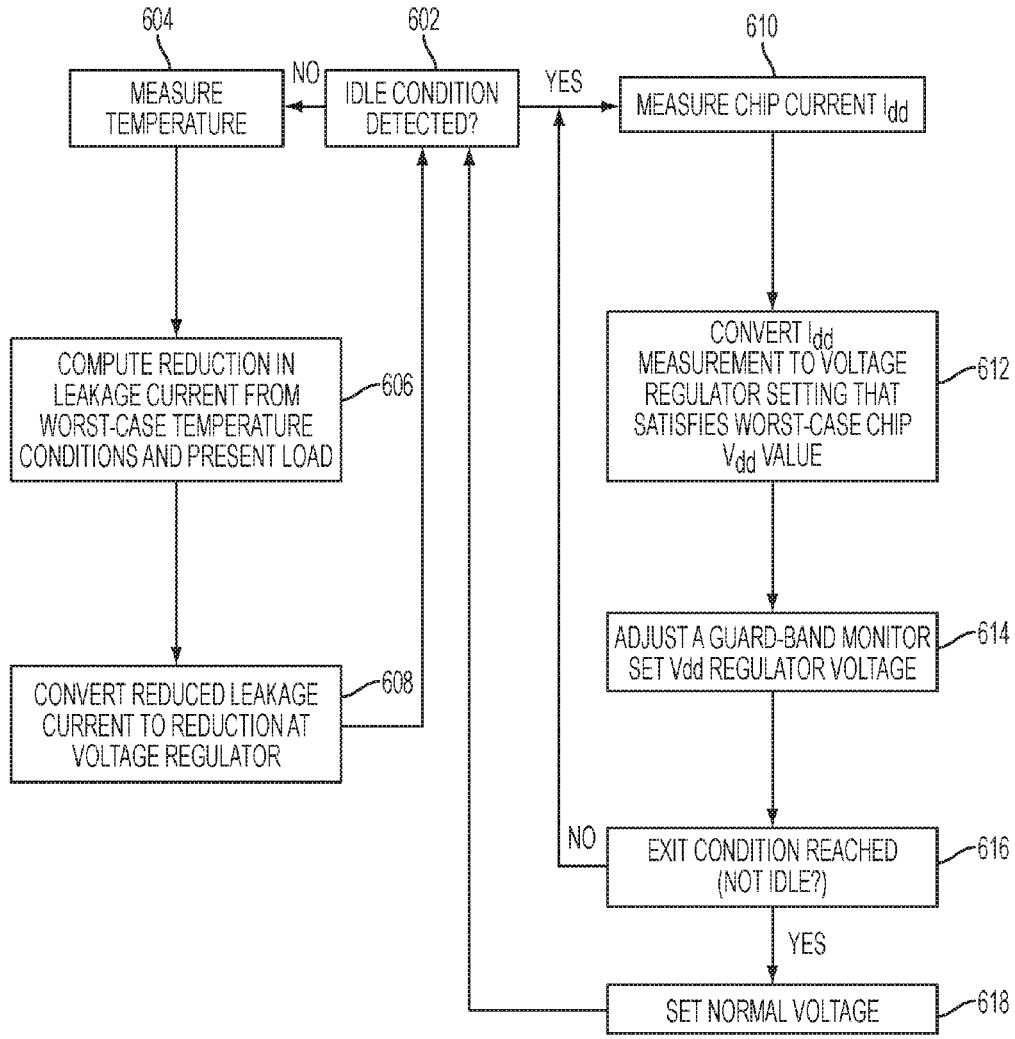
FIG. 6 shows an flowchart for operating the processor according to an embodiment of the present invention.

FIG. 6 shows flowchart 600 for operating the processor according to an embodiment of the present invention. In box 602, a test is made to determine whether the processor is in an idle condition. If the processor is not in an idle condition, the operating temperature is measured in box 604. In box 606, the change or reduction in the leakage current is calculated using the worst-case temperature operating conditions and the present temperature operating conditions and load. In box 608, the calculated change in leakage current is used to determine a reduction in voltage and to reduce the regulator voltage by the determined amount to a second voltage set point. The flowchart then returns the box 602.

Returning to box 602, if the processor is determined to be in an idle condition, the chip current $I_{dd}$ at the processor is measured in box 610. In box 612, the measured chip current $I_{dd}$ is converted to a voltage regulator $V_{dd}$ set point corresponding to the first load line that satisfies the worst-case chip voltage. In box 614, the guard-band monitor voltage is adjusted and the regulator voltage is reset to its calculated second regulator voltage set point. In box 616, a test is run to determine if an exit condition has been reached, i.e., if it is necessary to revert back to the first regulator voltage set point of the voltage regulator. For example, if the processor is no longer idle, the regulator voltage may be raised back to its first voltage set point. If an exit condition has not been reached, the flowchart cycles back through boxes 610, 612 and 614. If an exit condition has been reached, in box 618, the first voltage set point is re-established at the voltage regulator.

FIG. 7 illustrates a block diagram of a computer system 700 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 700, such as a personal computer, workstation, minicomputer, or mainframe computer.

In some embodiments, as shown in FIG. 7, the computer system 700 includes a processor 705, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid state drive. The stored instructions in memory 710 or in storage 720 may include those enabling the processor to execute one or more aspects of the systems and methods of this disclosure.

The computer system 700 may further include a display controller 725 coupled to a display 730. In some embodiments, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In some embodiments, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 700, such as that illustrated in FIG. 7.

Technical effects and benefits include the saving of power that would otherwise be wasted by maintaining the voltage at the voltage regulator at a high level. This leads to a more efficient processor operation as well as a potential for higher performance in power-constrained system by allowing power to be freed up for other applications and processes. In addition, processor temperatures are reduced which can lead to a reduction of fan power requirements, and power requirements at other related electronic components, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling power supplied to a processor, comprising:
    setting a voltage regulator to a first voltage regulator set point, wherein the first voltage regulator set point provides a first load line suitable to operate the processor in a first operating condition for processing a maximum power load scenario;
    measuring a reference leakage current and reference temperature of the processor while operating the processor in the first operating condition;
    while operating the processor in a non-idle operating condition along that is less than the maximum power load scenario:
    measuring a second temperature of the processor;
    calculating a leakage current difference for the non-idle operating condition from the reference leakage current and a difference between the reference temperature and the second temperature;
    setting the voltage regulator to a second voltage regulator set point that is less than the first voltage regulator set point by an amount that is a product of the leakage current difference and a load line resistance; and
    operating the processor at an operating condition on a second load line provided by the second voltage regulator set point.

2. The method of claim 1, wherein the second voltage regulator set point is less than the first voltage regulator set point.

3. The method of claim 1, wherein determining the change in an operating state of the processor further comprises determining a current difference between the first operating condition and the second operating condition and determining a change in the voltage regulator set point from the determined current difference.

4. The method of claim 1, further comprising setting a minimum voltage threshold that is less than the voltage for the operating condition along the second load line and raising the regulator voltage set point when a voltage through the processor decreases below the minimum voltage threshold.

5. The method of claim 1, further comprising determining when the processor is in an idle condition and setting the voltage regulator to the second voltage regulator set point based on a chip current in the idle condition.

6. A system for controlling power supplied to a processor, the system comprising:
    a memory having computer readable instructions; and
    one or more processors for executing the computer readable instructions, the computer readable instructions comprising:
    setting a voltage regulator to a first voltage regulator set point, wherein the first voltage regulator set point provides a first load line for operation of the processor in a first operating condition for processing a maximum power load scenario;
    measuring a reference leakage current and reference temperature of the processor while operating the processor in the first operating condition;
    while operating the processor in a non-idle operating condition that is less than the maximum power load scenario:
    measuring a second temperature of the processor;

calculating a leakage current difference for the non-idle operating condition from the reference leakage current and a difference between the reference temperature and the second temperature;

setting the voltage regulator to a second voltage regulator set point that is less than the first voltage regulator set point by an amount that is a product of the leakage current difference and a load line resistance; and operating the processor at an operating condition on a second load line provided by the second voltage regulator set point.

7. The system of claim 6, wherein the second voltage regulator set point is less than the first voltage regulator set point.

8. The system of claim 6, wherein determining the change in an operating state of the processor further comprises determining a current difference between the first operating condition and the operating condition along the first load lien and determining a change in the voltage regulator set point from the determined current difference.

9. The system of claim 6, further comprising setting a minimum voltage threshold that is less than the voltage for the operating condition on the second load line and raising the regulator voltage set point when a voltage through the processor decreases below the minimum voltage threshold.

10. The system of claim 6, further comprising determining when the processor is in an idle condition and setting the voltage regulator to the second voltage regulator set point based on a chip current in the idle condition.

11. A computer program product for controlling power supplied to a processor on a processor, the computer program product comprising a non-transitory computer readable storage medium having program instructions embodied therewith, the program instructions executable by a processor to cause the processor to perform:

setting a voltage regulator to a first voltage regulator set point, wherein the first voltage regulator set point provides a first load line for operation of the processor in a first operating condition for processing a maximum power load scenario;

measuring a reference leakage current and reference temperature of the processor while operating the processor in the first operating condition;

while operating the processor in a non-idle operating condition that is less than the maximum power load scenario:

measuring a second temperature of the processor;

calculating a leakage current difference at the non-idle operating condition from the reference leakage current and a difference between the reference temperature and the second temperature;

setting the voltage regulator to a second voltage regulator set point that is less than the first voltage regulator set point by an amount that is a product of the leakage current difference and a load line resistance; and operating the processor at an operating condition along a second load line provided by the second voltage regulator set point.

12. The computer program product of claim 11, wherein the second voltage regulator set point is less than the first voltage regulator set point.

13. The computer program product of claim 11, wherein determining the change in an operating state of the processor further comprises determining a current difference between the first operating condition and the operating condition along the first load line and determining a change in the voltage regulator set point from the determined current difference.

14. The computer program product of claim 11, wherein the program instructions further cause the processor to perform:

setting a minimum voltage threshold that is less than the voltage for the operating condition along the second load line and raising the regulator voltage set point when a voltage through the processor decreases below the minimum voltage threshold.

15. The computer program product of claim 11, wherein the program instructions further cause the processor to determine when the processor is in an idle condition and set the voltage regulator to the second voltage regulator set point based on a chip current in the idle condition.

* * * * *